United States Patent
Bansal et al.

(10) Patent No.: US 11,977,476 B2
(45) Date of Patent: May 7, 2024

(54) INCREMENTALLY VALIDATING SECURITY POLICY CODE USING INFORMATION FROM AN INFRASTRUCTURE AS CODE REPOSITORY

(71) Applicant: salesforce.com, inc., San Francisco, CA (US)

(72) Inventors: Kaushal Bansal, San Franisco, CA (US); Prabhat Singh, El Dorado Hills, CA (US); Selim Ciraci, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/587,896

(22) Filed: Jan. 28, 2022

(65) Prior Publication Data
US 2023/0244594 A1   Aug. 3, 2023

(51) Int. Cl.
*G06F 11/36* (2006.01)
*H04L 9/40* (2022.01)

(52) U.S. Cl.
CPC ........ *G06F 11/368* (2013.01); *G06F 11/3664* (2013.01); *G06F 11/3692* (2013.01); *H04L 63/20* (2013.01)

(58) Field of Classification Search
CPC .............. G06F 11/3664; G06F 11/368; G06F 11/3692; H04L 63/20
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Kelly Brady et al., "Docker Container Security in Cloud Computing," 2020 [retrieved on Jun. 15, 2023], 10th Annual Computing and Communication Workshop and Conference, pp. 0975-0980, <url>:https://ieeexplore.ieee.org. (Year: 2020).*

(Continued)

*Primary Examiner* — S. Sough
*Assistant Examiner* — Stephen D Berman
(74) *Attorney, Agent, or Firm* — Sterne, Kessler, Goldstein & Fox P.L.L.C.

(57) ABSTRACT

In an example, an apparatus may include a validation module configured to identify a security policy update from a security as code repository, wherein the identified security policy update is a candidate for deployment to a production environment having a plurality of attributes defined by an infrastructure as code repository; identify, from the plurality of attributes and using the infrastructure as code repository, individual attributes that correspond to the identified security policy update, wherein the identified individual attributes are identical to a subset of the plurality of attributes; generate a test environment based on the identified individual attributes; following deployment of the identified security policy update to the test environment, check for security exceptions or availability exceptions using the test environment; and output validation results based on a result of the checking.

20 Claims, 6 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,769,250 B1* | 9/2020 | Tautschnig ............ G06F 21/577 |
| 10,838,962 B2 | 11/2020 | Bansal et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |

(56) References Cited

U.S. PATENT DOCUMENTS

| | | |
|---|---|---|
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0180093 A1* | 6/2016 | Goss .................. G06F 21/6218 726/1 |
| 2017/0212830 A1* | 7/2017 | Thomas .............. G06F 11/3668 |
| 2019/0188313 A1 | 6/2019 | Bansal et al. |
| 2020/0278920 A1* | 9/2020 | Khakare ................. G06F 9/547 |
| 2020/0310779 A1* | 10/2020 | Van Heuklon ............ G06F 8/65 |
| 2020/0371898 A1* | 11/2020 | Aouad ...................... G06F 8/71 |
| 2021/0234890 A1 | 7/2021 | Bansal et al. |
| 2021/0241047 A1 | 8/2021 | Bansal et al. |
| 2021/0241179 A1 | 8/2021 | Karanth et al. |
| 2021/0263663 A1 | 8/2021 | Bansal et al. |
| 2021/0328807 A1 | 10/2021 | Bansal et al. |
| 2022/0086189 A1 | 3/2022 | Nguyen et al. |
| 2022/0086193 A1 | 3/2022 | Nguyen et al. |
| 2022/0191248 A1* | 6/2022 | Pieczul .............. H04L 63/0227 |
| 2023/0164164 A1* | 5/2023 | Herzberg ............. H04L 63/1441 726/1 |

OTHER PUBLICATIONS

Thorsten Rangnau et al., "Continuous Security Testing: A Case Study on Integrating Dynamic Security Testing Tools in CI/CD Pipelines," 2020 [retrieved on Jun. 15, 2023], IEEE 24th International Enterprise Distributed Object Computing Conference, pp. 145-154, <url>:https://ieeexplore.ieee.org. (Year: 2020).*

* cited by examiner

INCREMENTALLY VALIDATING SECURITY POLICY CODE USING INFORMATION FROM AN INFRASTRUCTURE AS CODE REPOSITORY

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to incrementally validating security policy code using information from an infrastructure as code repository.

DESCRIPTION OF THE RELATED ART

Syntactic validations may be applied during code generation of security policies. Once the security policy passes syntactic validation, the generated code may be deployed in a production environment.

Post deployment verifications may be performed by various services. However, this procedure runs the risk of a misconfiguration of policy that could lead to a security exception or an availability exception in the production environment, either of which could lead to disruption of service to users of the production environment, e.g., tenants in the case in which the production environment is a multi-tenant environment.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for incrementally validating security policy updates using information from an infrastructure as code repository.

I. Example System Overview

Figure 1A:
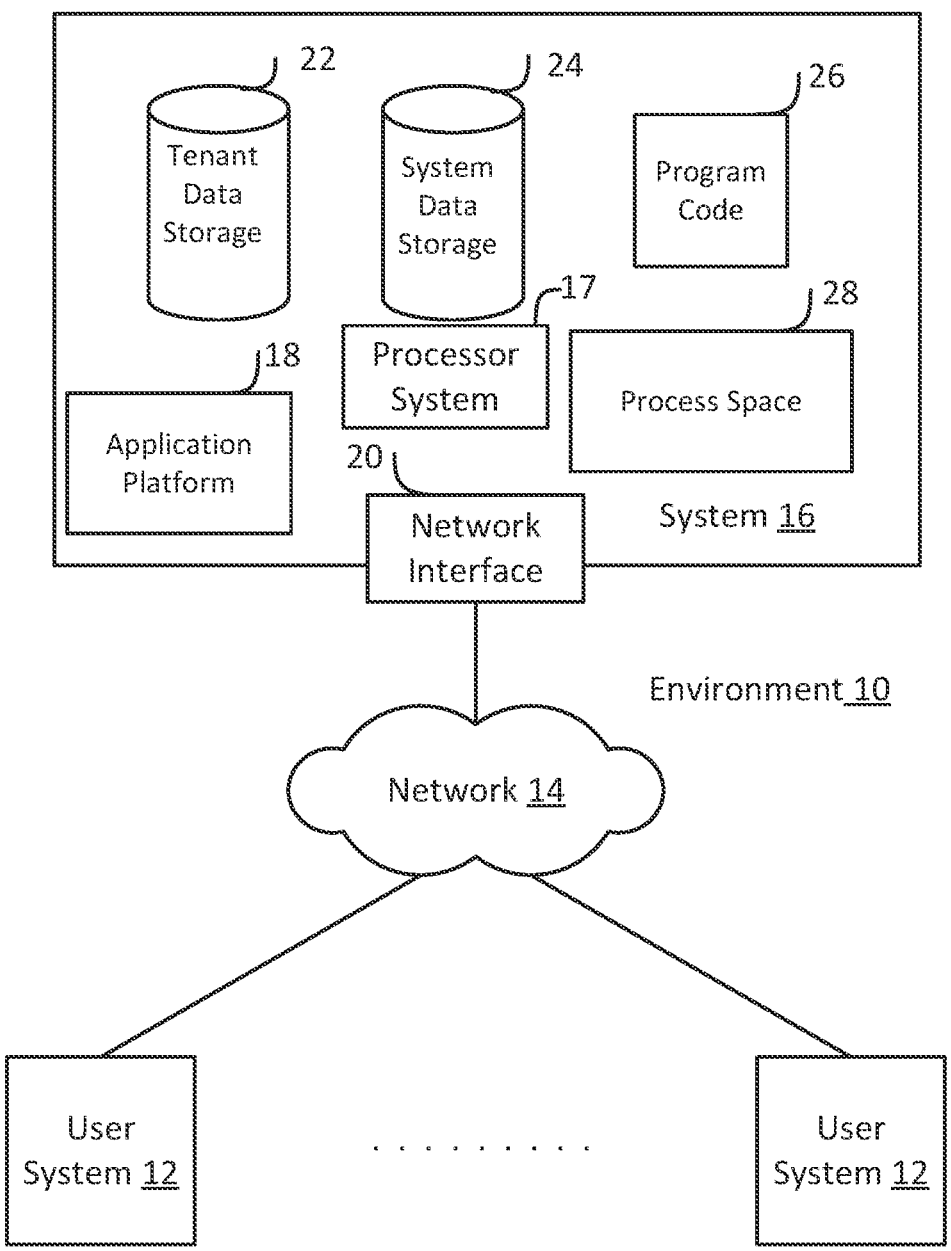
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
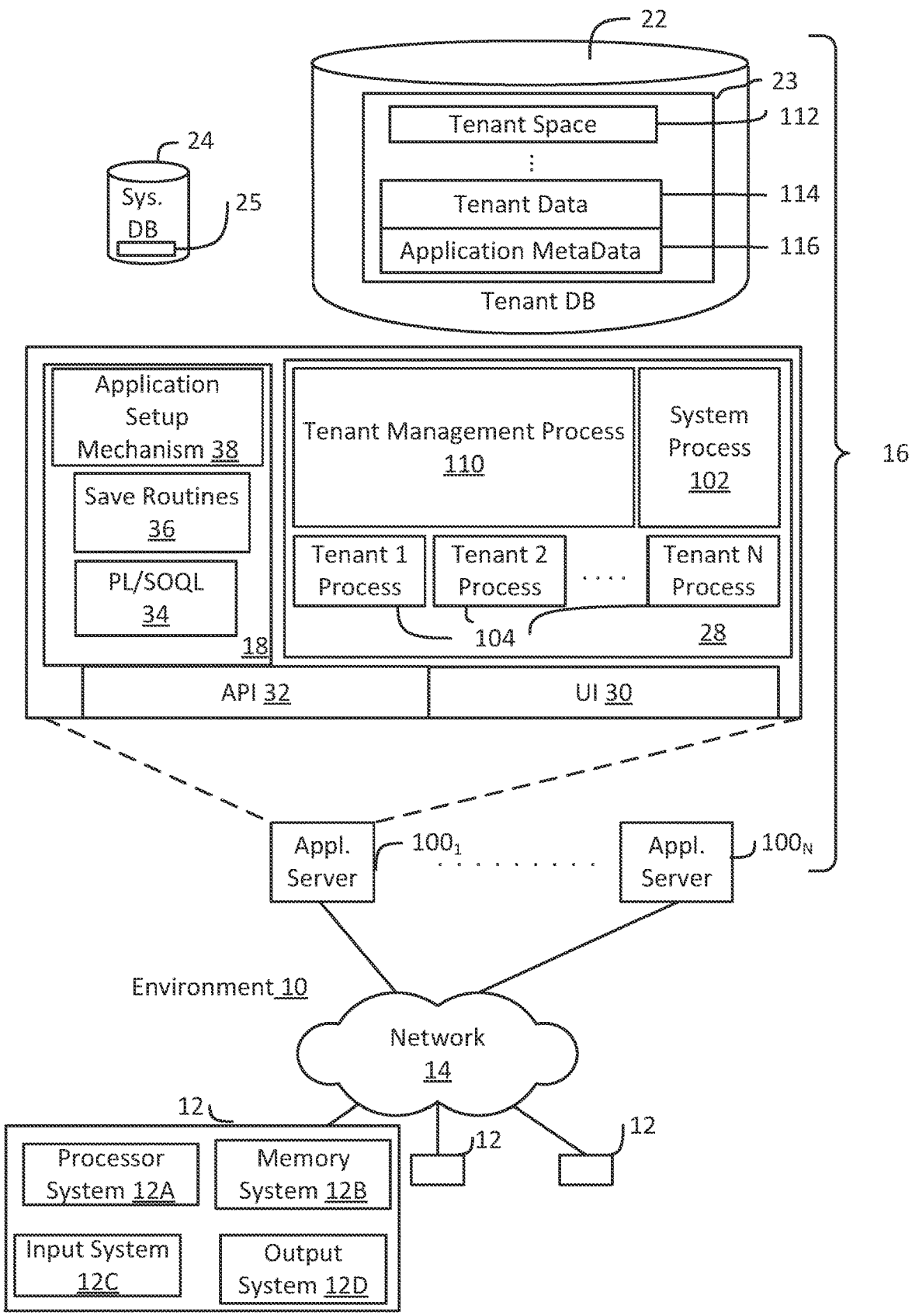
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 1001-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI- TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Incrementally Validating Security Policy Code Using Information from an Infrastructure as Code Repository Some environments, such as the environment described with reference to FIGS. 1A-B, may adopt Infrastructure as code where all the deployment descriptors are available a part of a code repo. An enterprise deployed in the public cloud is one example where all the deployment information may be stored as part of the GitHub repos and then deployed using various Continuous Delivery (CD) pipelines (e.g., Spinnaker pipelines).

Some of these environments may also begin to codify network security policies (Security as Code), for example in a multi-tenant environment with shared services among them. These service policy parameters may also be checked into the code repo (e.g., GitHub) and may be applied in a public cloud using cloud native APIs using a CD pipeline.

In some environments, there may be no semantic validations for these security policies (only syntactic validations are done during the code generation process). Post deployment verifications may be performed by different services in the production environment. However, this could result in a misconfiguration of policy in the production environment, which could lead to either a security exception or an availability exception in the production environment.

Even if semantic validation were performed in a development environment or a quality engineer environment, there may still be misconfigurations. This may be because the security policies defined in a development environment and/or a quality engineering environment may be different than the production environment in which the security policy is deployed. For example, the Policy definitions and the enforcement properties (e.g., IP Addresses) may be different.

It may not be feasible to spin up an identical environment of similar capacity as production environment for this validation. For example, an enterprise may have thousands of services managed across multiple business units and hundreds of teams, which leads to a very extension production environment. However, it would be desirable to incrementally validate the security/availability posture of a deployment, e.g., a multi-tenant multi-cloud deployment (e.g., during the CD pipeline).

Some environments may be a polyglot conglomerate of many independent sub systems, e.g., sub systems that have evolved over time such as over years. Some of the sub systems may have further sub systems of their own (e.g., nested sub systems). One way to find a boundary for these subsystem is at the deployment level, and that can be used to separate them.

In conventional enterprises, the information regarding the deployment, connecting them together and securing them may be dispersed across manual run books, institutional knowledge with people working on them over years. Configuration knowledge about connecting the sub systems and securing them may also be distributed across these resources. Also, ad hoc changes may have been applied over time to accommodate various scenarios.

An environment for a modern enterprise may employ infrastructure as code and security as code. As a result, institutional knowledge about the environment may be made available as code in common repository and no ad hoc changes can be made directly on the system (or if made are not immutable). In the environment that employs infrastructure as code and security as code, any immutable changes may have to be made available as part of the code.

With all this deployment information with regard to compute, networking and security available at code at a centralized repository, various portions of the environment may be replicated in a repeatable fashion with consistency as the environment may be immutable. These repeatable environment instances may be grouped into a logical group as a representation of the production environment.

All the information with regard to networking (connectivity/availability) and security may be available in a single place so that automations may be run based on real data instead of test data. A repeatable environment instance may be defined as templates to provide instantiation of a simulated environment on demand. Security policies may be defined in these templates so they can be applied the same way when the templates are instantiated.

Figure 2A:
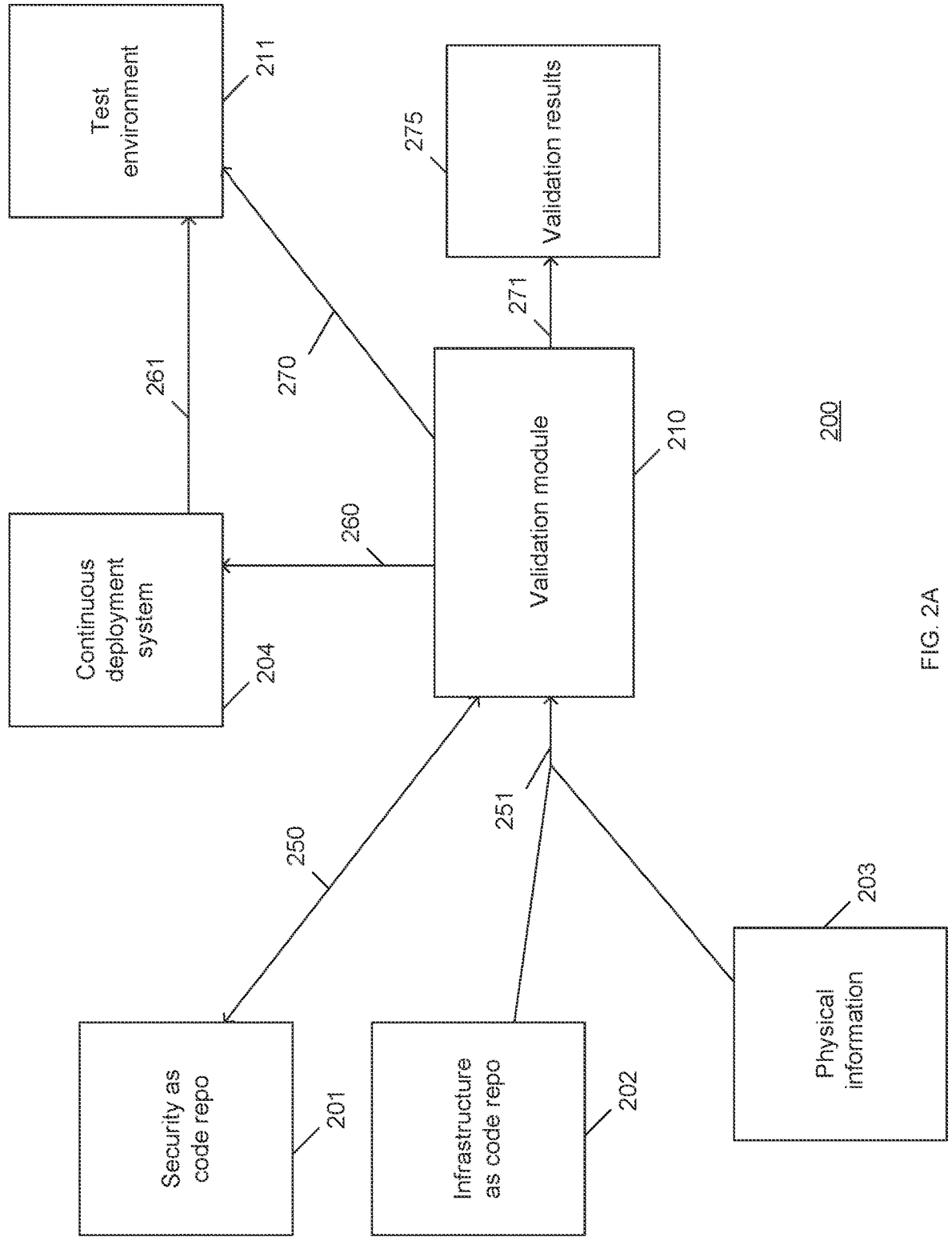
FIG. 2A is a schematic diagram of a computing system for incrementally validating security policy code using information from an infrastructure as code repository, according to various embodiments.

FIG. 2A is a schematic diagram of a computing system 200 for incrementally validating security policy code using information from an infrastructure as code repository 202, according to various embodiments. The system 200 may include an infrastructure as code repo 202 on which a production environment (not shown) is based. The production environment may be similar in any respect to the environment 10 of FIG. 1A or any other environment described anywhere herein. The system 200 may also include one or more other repositories 203 that may define configuration details or other physical information of the production environment.

A validation module 210 may include one or more processors to execute instructions stored on a memory to perform any validation operations described herein. The one or more processors and the memory may be part of any processor system described herein. Validation module 210 may identify 250 an individual security policy update using information from the security as code repository 201.

The validation module may identify 251 attributes of the production environment and configuration details from the repositories 202 and 203, respectively. In various embodiments, the identified attributes and configuration details may be a subset of all the attributes and configuration details of the production environment. This subset may be identified based on the identified individual security policy update.

The validation module 210 may command 260 the continuous deployment system to deploy a test environment 211 having the same attributes and configuration details as the production environment. The test environment 211 may be based on the subset of attributes and configuration details that were identified based on the individual security policy update. Accordingly, the test environment 211 may be identical to a subset of the production environment that is associated with the identified individual security update.

With the test environment 211 deployed, the validation module 210 may incrementally validate 270 the individual security policy update using the test environment 211. The validation module 210 may generate and output 271 validation results 275 based on the validation 270. The validation results 275 may indicate whether any security or availability exceptions were observed in the test environment 211 following the deployment 261 of the individual security update in the test environment 211. In some embodiments, the validation results 275 may include metrics about the validation 270 of the individual security policy update.

In some embodiments, the validation module 210 may output 271 validation results 275 and some other entity (such as an administrator or another module) may determine whether to deploy the individual security update in the production environment based on the validation results 275. Regardless of which entity determines to deploy the individual security policy in the production environment, this deployment may be performed using the continuous deployment system 204.

Figure 2B:
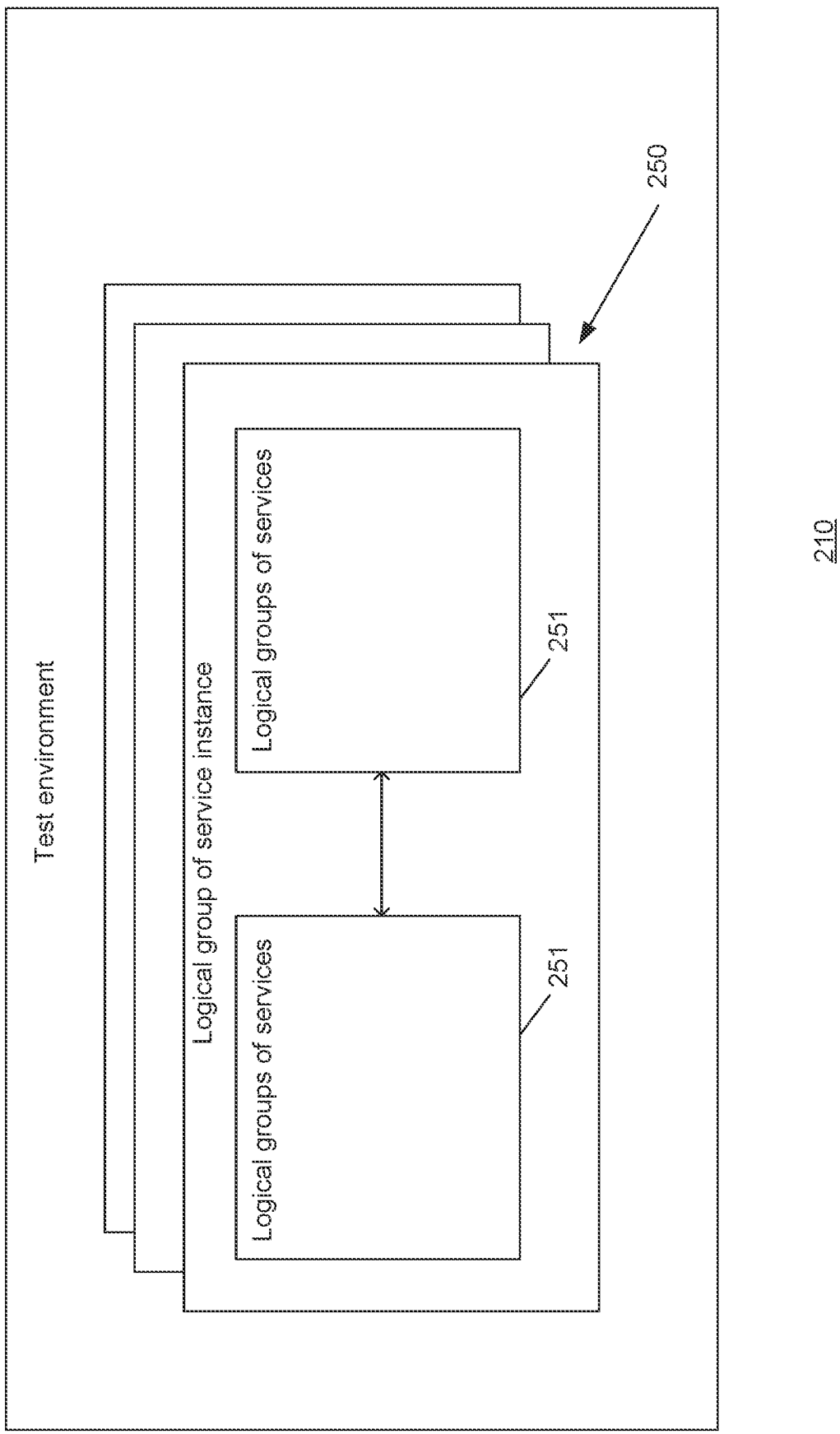
FIG. 2B is a block diagram of the test environment of FIG. 2A, according to various embodiments.

FIG. 2B is a block diagram of the test environment 211 of FIG. 2A, according to various embodiments. The test environment 211 may include any number of logical group of service instances 250 (e.g., a container for a geographical region, such as the required services to serve a customer of the production environment for a geographical region). Each logical group of service instances 250 may include one or more interconnected logical groups of services (also referred to as functional domains) 251 (e.g., services that share similar business or shared service capabilities).

Functional domains 251 of the test environment 211 may include overall network boundaries and security policies for those boundaries. Each functional domain 251 may contains various services in it. These services may offer endpoints to which other services, UI components or customer integration connect to. The functional domains 251 may be carved into different network segments and a service can be part of one of more segments. The logical group of service instances 250 or other repeatable environment can be grouped in a logical fashion which can represent a logical group of service instance 250. A production environment, such as an environment similar in any respect to the environment described in reference to FIGS. 1A-B may be defined by one or more logical group of service instances 250.

Policies for the production environment may be defined as follows, for example. A service from one segment can to connect to a service in a different segment. A service from one functional domain 251 can talk to another service in another functional domain 251 of the same logical group of service instance 250. A service from one functional domain 251 can talk to another service in another functional domain 251 in a different logical group of service instance 250.

Figure 3:
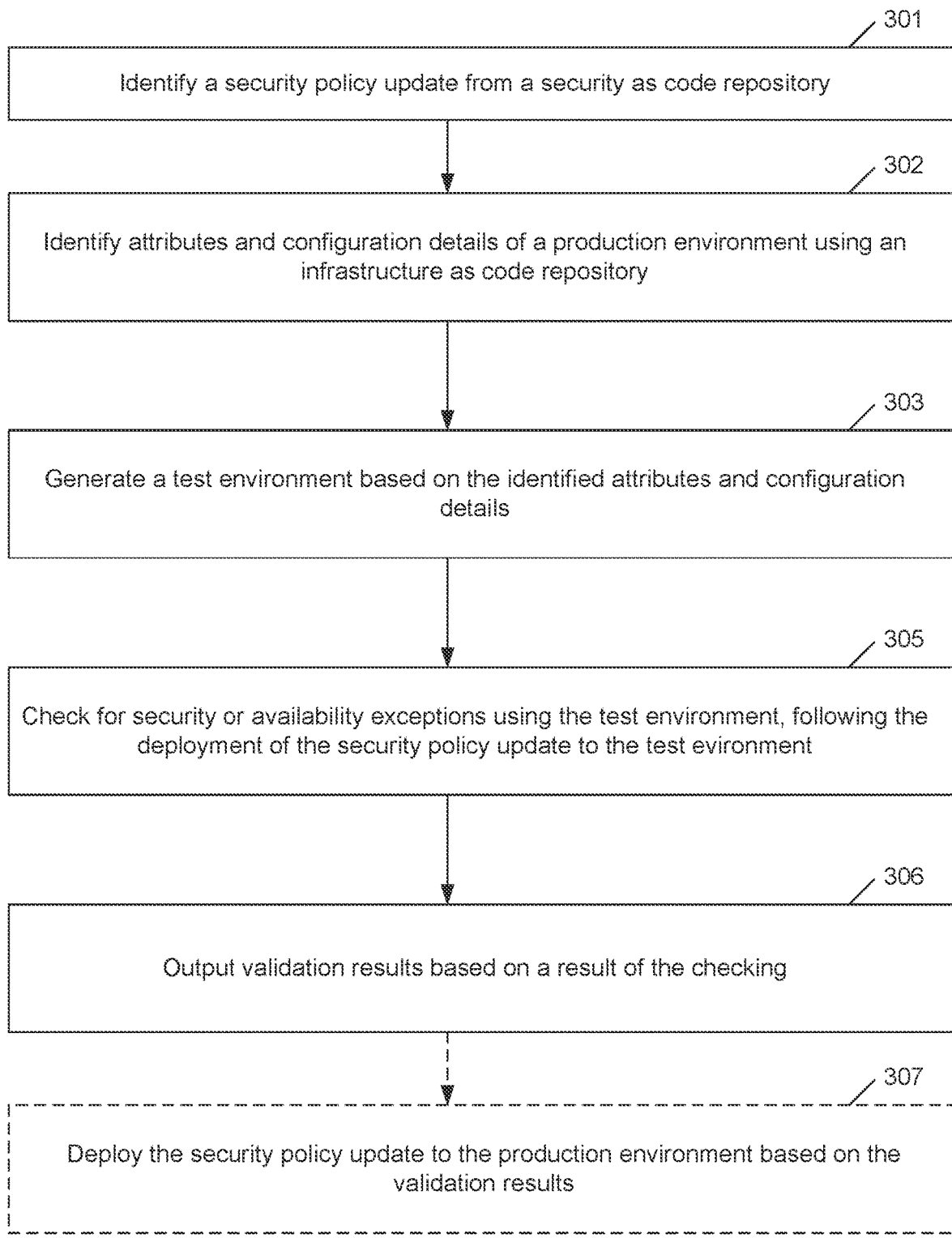
FIG. 3 illustrates a process that may be performed by a validation module to incrementally validate security policy code using information from an infrastructure as code repository, according to various embodiments.

FIG. 3 illustrates a process 300 that may be performed by a validation module (e.g., the validation module 210 of FIG. 2A) to incrementally validate security policy code using information from an infrastructure as code repository (e.g., infrastructure as code repo 202), according to various embodiments. In block 301, the validation module may identify a security policy update from a security as code repository.

In block 302, the validation module may identify attributes and configuration details of a production environment using an infrastructure as code repository. The configuration details may be based on a repository containing physical information about the production environment (e.g., repository 203 of FIG. 2) in various embodiments. The attributes and configuration details may be a subset of the attributes and configuration details of the production environment (e.g., a subset corresponding to the individual security policy update).

In block 303, the validation module may generate a test environment based on the identified attributes and configuration details. In some embodiments, the generation may be by controlling a continuous deployment system (e.g., CD system 204). The test environment may be identical to a portion of the production environment.

In block 305, after the individual policy update is deployed to the test environment, the validation module may check for security or availability exceptions using the test environment. In block 306, the validation module may generate validation results based on the checking.

The validation results may be usable by the validation module or some other entity to determine whether to deploy 307 the security policy update to the production environment. Deployment to the production environment may utilize the same continuous deployment system (e.g., CD system 204 of FIG. 2A).

In various embodiments, the processes 301-307 may be repeated for a next security code update in the security code repository. This may provide incremental validation of security code updates. Each validation may be using a different test environment, each of which may be identical to the same or different portion of the production environment.

In any embodiment described herein, with the infrastructure and security as code, the entire deployment definition may be available at unified place, prior to run time. A bill of materials (BOM) may be updated with all the details wherein the environment may be deployed, e.g., with cloud provider specific information). The updated bill of materials (BOM) of the production environment may be used to generate the test environment.

In any embodiment described herein, a shared ownership model may be utilized where a security team may maintain the overall security postures across all services without impacting the availability, while the individual services are looking at availability and security for services owned by them.

In contrast to some other validations where the testing at times is not possible to simulate in a staging environment by the service owners (or may be only limited to their service and not overall security postures), in any embodiment described herein the test environment may be identical to a part of the production environment. Also, some staging environments may not use the actual configuration data (a test environment generated by any validation module described herein may use the actual configuration data).

In any embodiment described herein, the validation module may run paths mandated by a security team for overall security posture and individual path defined with service owners.

In any embodiment described herein, the tests run by the validation module may use the actual constructs (IPs, network path, etc.) Also, the test environment may be a trimmed down version of the production environment (testing only a subset at time so that the CD system does not deploy all the actual constructs in one deployment). Validation may be performed incrementally, with actual constructs of different portions of the production environment generated/tested at different times. In some embodiments, the validation module may track first time vs incremental changes.

According to various embodiments, since all the network security policies are available as part of security as code repository, validation of the enforcement of these network policies can be performed before they are deployed using a simulated environment (e.g., a generated test environment) whenever a new policy changed is pushed by a service owner (e.g., committed to a security as code repository). Since the security policies meant for network segmentation for a given environment are available as code upfront, it is possible to validate those security policies in a test environment using the exact same definition. During one of the continuous delivery phases, network connectivity may be validated among different shared services which are deployed as part of different functional domains.

In some embodiments, validation may be for the following flows:
  Network segmentation enforcement as carved out for different functional domains and services running within them. A set of services defined in one security group may not be able to reach to the services in a different security group until otherwise allowed. This may validate the security posture of the a public cloud enterprise deployment.
  A shared service deployed in one functional domain may be accessible from a service deployed in a separate functional domain.
  These tests may be auto-generated by the framework during a given CD pipeline phase. These tests may validate that the security posture is intact and owned by the security team in shared responsibility, self-service model. Since this may be a self-service model where the service owner can define policy, they can accidentally create security exposure which could be considered a threat. Some embodiments may allow a security team to make sure that they validate that network security is not impacted by the changes.
  In some embodiments, there may be a specific test that a service owner can write to validate their flows. This may be tuned towards the availability aspect. If a business unit owns a set of services running in a 1st party (1P) datacenter and others in a public cloud, they may want to make sure that services in 1P datacenter can reach to services running in the public cloud. Before rolling out any security policy configuration in production made by them, they may validate that availability is not impacted because of this change using any validation module described herein.

In one embodiment, a computing system may allow a service owner to make a change to their policy definition details. The computing system may then generate an updated BOM that reflects the changes. A updated BOM may contain all the configuration details for a given logical group of service instance/logical group of services that is used by the CD pipeline to deploy all the services. The updated BOM may contain the networking and security configuration as well.

During the deployment process of a security code update, one phase may utilize the validation module to confirm that the changes are not impacting security as well as availability. During this phase, the validation module may cause a small environment to be spun up, including configuration of the required components based on the paths defined by the service owner team for availability and paths defined by a security team for security.

The components may represent the end points of the service owners, e.g., a service running in 1P datacenter, an end user, or the like. A service running in another logical group of service instance may be a container.

The connectivity may be configured using the Linux networking components, as the configuration may be derived from the BOM definition, IP addresses, subnet, etc. Addresses (e.g., IP address) may be assigned to endpoints based on this, and a network route may be configured based on those addresses. For example, if both endpoints are part of same security policy but different virtual private cloud subnets, containers may be deployed from those subnets and connected using Linux L3 routing constructs.

The security may be configured using Linux networking components i.e. IPtables, EPF, etc., and actual configuration may be derived from the BOM definition. The firewall rules in the IPtables may also be configured using this information. In the test environment, traffic may be sent from one endpoint to another endpoint using either pings or HTTP requests based on the path defined by the service owners as well as security team. Based on the validation results, we can isolate that if availability or security is not regressed with this new configuration change (before its rolled out in production).

In some embodiments, a service owner change module of the validation module may attribute policy changes to one of the following: a new path has been added, an existing path has been updated, an existing path has been deleted, etc. The service owner change module may output to a path selection module of the validation module.

In some embodiments, the path selection module of the validation module may identity the path based on the policy change. Since the policy changes may be related to a functional domain type, the validation module may be configured to validate all the paths for that type. However, since the pipelines may be running only for a given logical group of service instance, tests may be run only for functional domains of the given logical group of service instance.

Once the paths have been identified, the validation module may enrich the path based on the updated BOM. In some examples, Source IP, Destination IP, Port, Protocol etc. may be configured for a given flow.

In some embodiments, the validation module may identify the network component:
  If the source and destination IPs are part of same subnet, then no routing/NAT may be needed and a simple deployment may be utilized. In one example, this may include a simple L2 network where both the containers are part of same bridge. IP tables can be programmed with the enriched and translated paths with the correct policy.
  If the source and destination are part of a different subnet, then the validation module may create a L2 network with the source, and L2 network with destination, and connect the two using a NAT gateway, and apply the policies.

In some embodiments, the validation module may be configured to translate an actual network topology to produce a trimmed down version of the production environment. This may be done using Linux network stack i.e. IPtables, ESVC, bridge, etc., and containers. In some public cloud enterprise deployments, a /8 logical network may be instantiated, and then this network may be carved in /12 logical space for segmentation, and they finally allocating IPs Address in /21 space for these workloads to make the /8 network completely routable. In some embodiments, standard routing and firewall capabilities provided by cloud service providers may be utilized.

In a flat /8 routable space the traffic flow and the policy enforcement may be simulated using a standard Linux networking stack along with containers in a single host. This may include defining a path to be tested, and then creating that path by deploying the required network constructs between the endpoints of that path using the standard Linux networking stack. The endpoints may be simulated using containers and running actual network traffic from one end point to another endpoint.

The path can be utilized for following scenarios:

Intra functional domain traffic where both the end point are part of same functional domain-shared services;

Egress traffic for a given functional domain for a given service, including traffic reaching out to Internet and traffic reaching out to another functional domain;

Ingress traffic for a given service in a given security group;

Inter functional domain where shared services are part of different functional domain; and/or Trusted traffic from 1P datacenter to any functional domain in a public cloud.

Example Electronic Devices and Environments

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users.

Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
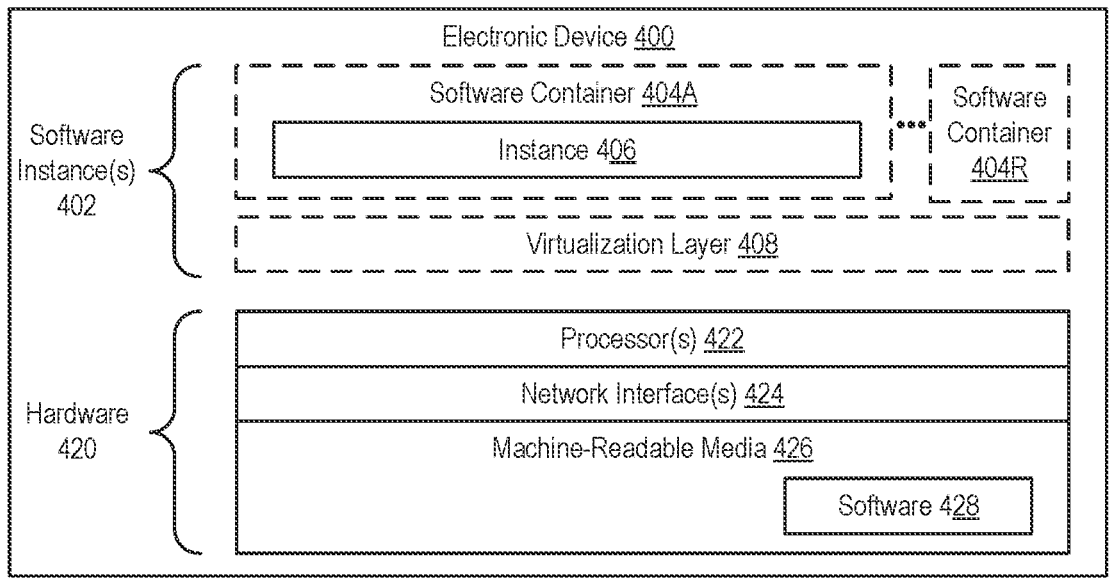
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described modules for validation security policy code using information from an infrastructure as code repository may be implemented in one or more electronic devices 400. In one implementation: 1) each of the clients is implemented in a separate one of the electronic devices 400 (e.g., in end user devices where the software 428 represents the software to implement clients to interface directly and/or indirectly with the validation module (e.g., software 428 represents a web browser, a native client, a portal, a command-line interface, and/or an application programming interface (API) based upon protocols such as Simple Object Access Protocol (SOAP), Representational State Transfer (REST), etc.)); 2) the validation module is implemented in a separate set of one or more of the electronic devices 400 (e.g., a set of one or more server devices where the software 428 represents the software to implement the validation module); and 3) in operation, the electronic devices implementing the clients and the validation module would be communicatively coupled (e.g., by a network) and would establish between them (or through one or more other layers and/or or other services) connections for submitting security code updates to the validation module and returning validation results. Other configurations of electronic devices may be used in other implementations (e.g., an implementation in which the client and the validation module are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 4B:
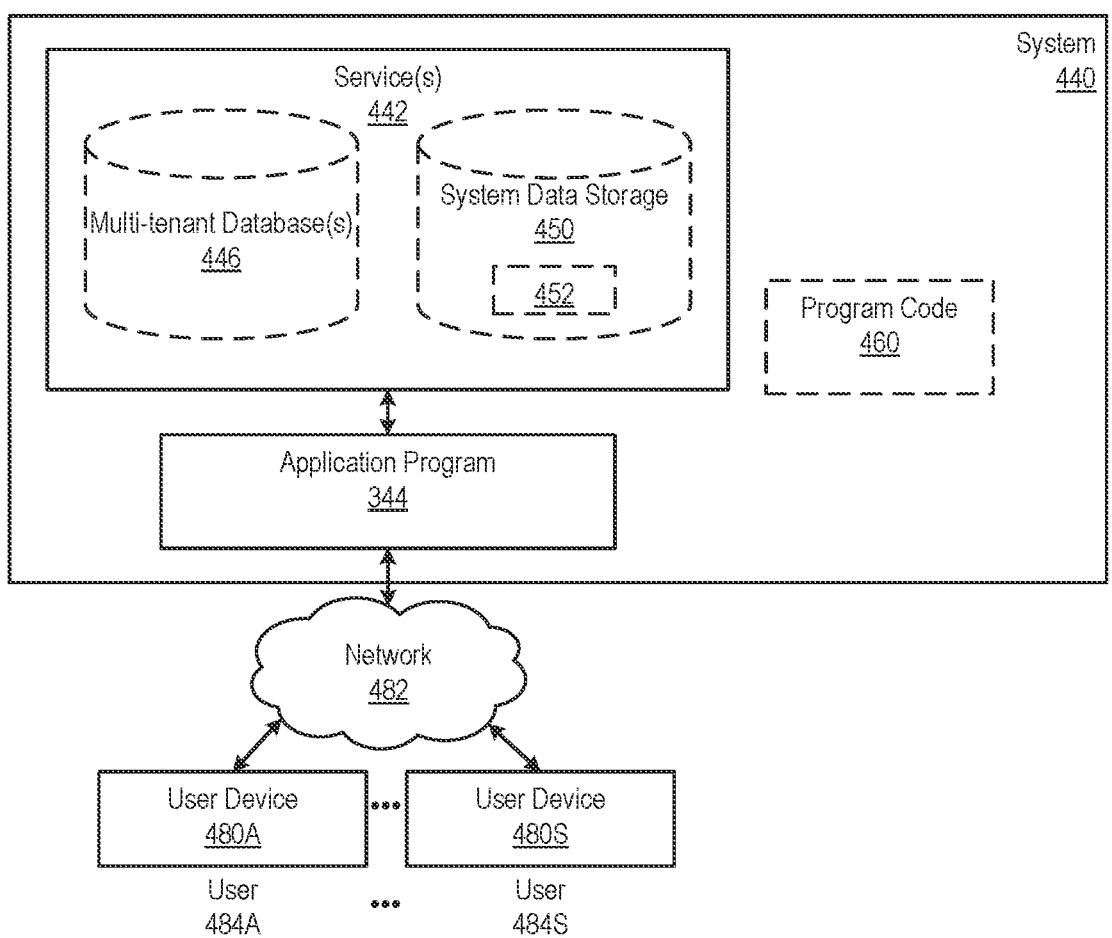
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the validation module. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Validation service 442 operated using any validation module described herein, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the validation module, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

The invention claimed is:

1. An apparatus comprising:
a processor; and
a memory coupled with the processor, the memory storing instructions for incrementally validating network security policy updates prior to deploying the updates to a production environment, the instructions executable by the processor to cause the apparatus to:
i) identify a security policy update, of the network security policy updates, from a security as code repository, wherein the identified security policy update is a candidate for deployment to the production environment having a plurality of attributes defined by an infrastructure as code repository;
ii) identify, from the plurality of attributes and using the infrastructure as code repository, individual attributes that correspond to the identified security policy update, wherein the identified individual attributes are identical to a subset of the plurality of attributes;
iii) generate a test environment based on the identified individual attributes;
iv) following deployment of the identified security policy update to the test environment, perform a validation to check for security exceptions or availability exceptions using the test environment;
v) output validation results based on a result of the validation; and
repeat processes i) through v) for a next security policy update such that a next test environment is generated for the next security policy update in order to provide incremental validation of security code updates.

2. The apparatus of claim 1, wherein the validation includes semantic validation.

3. The apparatus of claim 1, wherein the test environment is identical to a subset of the production environment.

4. The apparatus of claim 1, wherein the test environment includes one or more functional domains having configuration details that are identical to configuration details of one or more corresponding functional domains of the production environment.

5. The apparatus of claim 4, wherein the test environment further includes a container having configuration details that are identical to configuration details of a container of the production environment, wherein at least one of the one or more functional domains of the test environment is part of the container of the test environment.

6. The apparatus of claim 1, wherein the instructions are executable by the processor to cause the apparatus to generate metrics indicative of a result of availability testing in the test environment.

7. The apparatus of claim 1, wherein the validation results specify any detected network exceptions.

8. The apparatus of claim 1, wherein the instructions are executable by the processor to cause the apparatus to:
identify, from a repository containing physical information indicating configuration details of the production environment, individual values of the configuration details that correspond to the identified security policy update, wherein the test environment is generated using the identified individual values of the configuration details.

9. The apparatus of claim 1, wherein the instructions are executable by the processor to cause the apparatus to deploy an individual security policy update to the test environment using a continuous deployment (CD) pipeline.

10. The apparatus of claim 9, wherein deploying the individual security policy update to the test environment using the CD pipeline comprises signaling a CD system to deploy the identified security policy update in the test environment.

11. A method, comprising:
i) accessing, by a validation module, a security as code repository to identify a security policy update for a production environment having a plurality of attributes defined by an infrastructure as code repository;
ii) accessing, by the validation module, the infrastructure as code repository to identify, from the plurality of attributes and using the infrastructure as code repository, individual attributes that correspond to the identified security policy update, wherein the identified individual attributes are identical to a subset of the plurality of attributes;
iii) generating a test environment based on the identified attributes;
iv) deploying the identified security policy update to the test environment using a continuous deployment (CD) system, wherein the validation module is configured to check for security exceptions or availability exceptions using the test environment following the deployment of the identified security policy update;
v) deploying the identified security policy update to the production environment based on a result of the checking using the test environment; and
repeating processes i) through v) for a next security policy update such that a next test environment is generated for the next security policy update in order to provide incremental validation of security code updates.

12. The method of claim 11, wherein the identified individual attributes comprise first attributes of the plurality of attributes, and the method further comprises:
identifying the next security policy update for the production environment from the security as code repository;
identifying, from the plurality of attributes and using the infrastructure as code repository, individual attributes that correspond to the identified next security policy update, wherein the individual attributes that correspond to the identified next security policy update comprise second attributes of the plurality of attributes, and wherein the identified next individual attributes are identical to the subset or a different subset of the plurality of attributes;
generating the next test environment based on the second attributes;
deploying the identified next security policy update to the next test environment using the (CD) system, wherein the validation module is configured to check for security exceptions or availability exceptions using the next test environment following the deployment of the identified next security policy update; and
deploying the identified next security policy update to the production environment based on a next result of the checking using the next test environment.

13. The method of claim 12, wherein one of the first attributes includes at least one attribute not present in the second attributes or one of the second attributes includes at least one attribute not present in the first attributes.

14. The method of claim 12, wherein the security policy update and the next security policy update are deployed to the production environment at different times.

15. The method of claim 12, wherein the next security policy update is deployed to the production environment after the deploying of the security policy update.

16. The method of claim 12, wherein the next test environment includes one or more functional domains having configuration details that are identical to configuration details of the same or a different one or more corresponding functional domains of the production environment.

17. The method of claim 11, further comprising generating metrics indicative of a result of availability testing in the test environment.

18. The method of claim 11, wherein the result of the checking specifies any detected network exceptions.

19. The method of claim 11, further comprising:
identifying, from a repository containing physical information indicating configuration details of the production environment, individual values of the configuration details that correspond to the identified security policy update, wherein the test environment is generated using the identified individual values of the configuration details.

20. The method of claim 11, further comprising deploying an individual security update to the test environment using a CD pipeline.

* * * * *